(12) United States Patent
Tomoda

(10) Patent No.: US 10,941,506 B2
(45) Date of Patent: Mar. 9, 2021

(54) PLIED CORD, PRODUCTION METHOD THEREFOR, TRANSMISSION BELT, AND METHOD FOR USING SAME

(71) Applicant: Mitsuboshi Belting Ltd., Kobe (JP)

(72) Inventor: Takuya Tomoda, Hyogo (JP)

(73) Assignee: Mitsuboshi Belting Ltd., Kobe (JP)

(*) Notice: Subject to any disclaimer, the term of this patent is extended or adjusted under 35 U.S.C. 154(b) by 144 days.

(21) Appl. No.: 16/343,660

(22) PCT Filed: Oct. 17, 2017

(86) PCT No.: PCT/JP2017/037532
§ 371 (c)(1),
(2) Date: Apr. 19, 2019

(87) PCT Pub. No.: WO2018/074471
PCT Pub. Date: Apr. 26, 2018

(65) Prior Publication Data
US 2019/0276954 A1    Sep. 12, 2019

(30) Foreign Application Priority Data

Oct. 20, 2016   (JP) .............................. JP2016-206182
Oct. 2, 2017    (JP) .............................. JP2017-192971

(51) Int. Cl.
*D02G 3/28*    (2006.01)
*F16G 1/10*    (2006.01)
(Continued)

(52) U.S. Cl.
CPC ................. *D02G 3/28* (2013.01); *F16G 1/10* (2013.01); *F16G 5/06* (2013.01); *F16G 5/08* (2013.01); *D10B 2331/021* (2013.01)

(58) Field of Classification Search
CPC ........ D02G 3/28; F16G 1/10; D10B 2331/021
See application file for complete search history.

(56) References Cited

U.S. PATENT DOCUMENTS 4,783,367 A    11/1988    Maatman et al.
4,787,200 A    11/1988    Inada et al.
(Continued)

FOREIGN PATENT DOCUMENTS

EP    0420333 A1    4/1991
EP    3106712 A1    12/2016
(Continued)

OTHER PUBLICATIONS

Jan. 16, 2018—International Search Report—Intl App PCT/JP2017/037532.
(Continued)

*Primary Examiner* — Shaun R Hurley
(74) *Attorney, Agent, or Firm* — Banner & Witcoff, Ltd.

(57) ABSTRACT

A plied cord includes three or four first twist yarns containing para-aramid fibers, wherein: the para-aramid fibers have an average size of 1000-1250 dtex, a tensile elasticity of 55-70 GPa and a tensile strength of 2800-3500 MPa; and for the plied cord, the number of first twists when the number of the first twist yarns is three is 33-40 twists/10 cm and the number of first twists when the number of the first twist yarns is four is 42-52 twists/10 cm, the second twist direction is the opposite direction from the first twist, and the ratio of the second twist coefficient to the first twist coefficient is 0.25-1.

20 Claims, 1 Drawing Sheet

(51) Int. Cl.
*F16G 5/08* (2006.01)
*F16G 5/06* (2006.01)

(56) References Cited

U.S. PATENT DOCUMENTS

| | | | | |
|---|---|---|---|---|
| 5,425,681 | A * | 6/1995 | Van Hook | D02G 3/447 |
| | | | | 474/263 |
| 5,802,839 | A * | 9/1998 | Van Hook | D02G 3/28 |
| | | | | 474/263 |
| 7,254,934 | B2 * | 8/2007 | Wu | D02G 3/28 |
| | | | | 57/241 |
| 9,765,851 | B2 * | 9/2017 | Kobayashi | F16G 1/08 |
| 2003/0087715 | A1 | 5/2003 | Fujimoto | |
| 2006/0213174 | A1 | 9/2006 | Wu | |
| 2007/0259746 | A1 | 11/2007 | Wu | |
| 2017/0045116 | A1 | 2/2017 | Kobayashi | |
| 2017/0327977 | A1 * | 11/2017 | Cornille | D07B 1/025 |
| 2017/0327978 | A1 * | 11/2017 | Cornille | D02G 3/48 |

FOREIGN PATENT DOCUMENTS

| | | |
|---|---|---|
| JP | S62-263320 A | 11/1987 |
| JP | H03-151229 A | 6/1991 |
| JP | 2516614 Y2 | 11/1996 |
| JP | 2003-130137 A | 5/2003 |
| JP | 2006-207067 A | 8/2006 |
| JP | 2009-079337 A | 4/2009 |
| JP | 4694616 B2 | 6/2011 |
| JP | 5750561 B1 | 7/2015 |
| JP | 2016-176168 A | 10/2016 |
| WO | 2015-121907 A1 | 8/2015 |
| WO | 2015-193934 A1 | 12/2015 |

OTHER PUBLICATIONS

Jan. 10, 2019—(JP) Information Offer—App 2017-192971.
Aug. 3, 2020—(EP) Extended Search Report—App 17862244.5.

* cited by examiner

[FIG. 1]
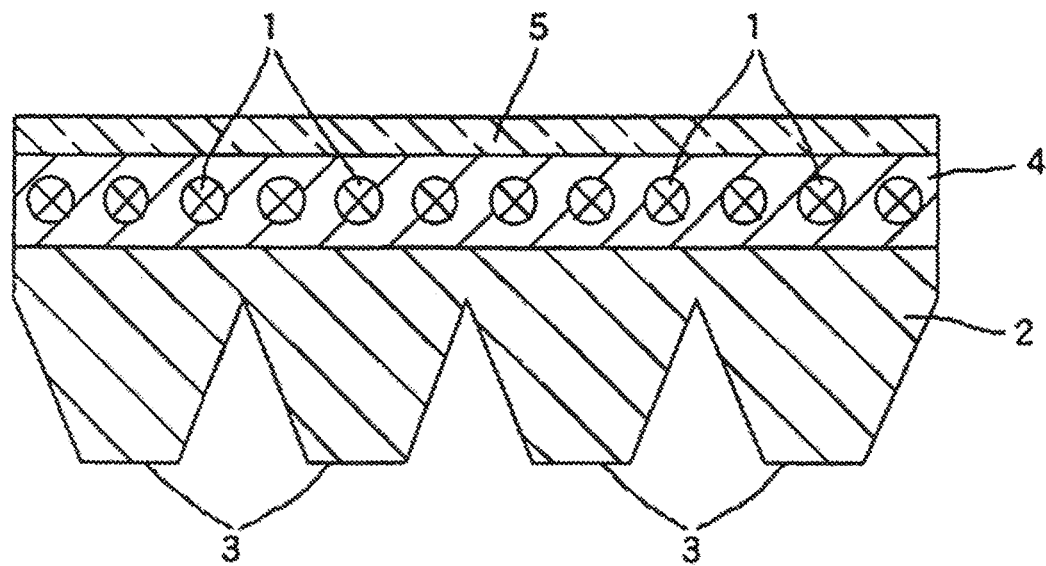
[FIG. 2]
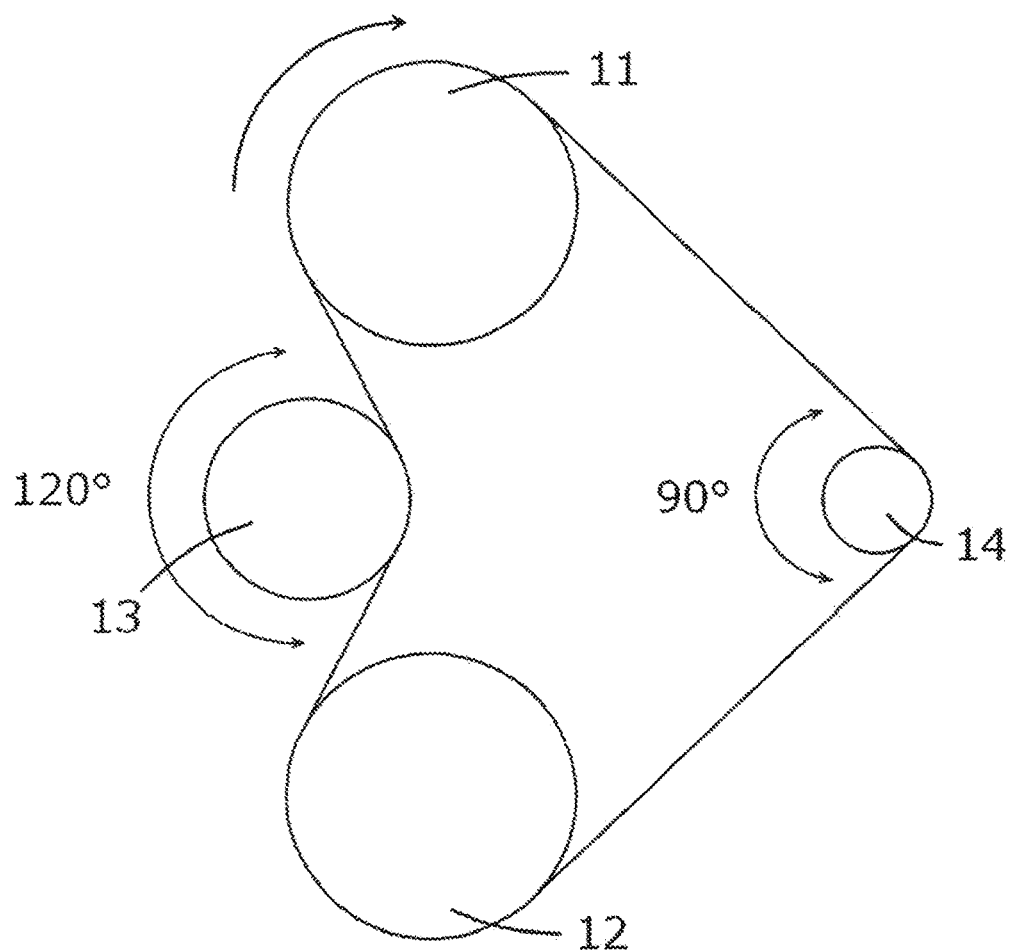

PLIED CORD, PRODUCTION METHOD THEREFOR, TRANSMISSION BELT, AND METHOD FOR USING SAME

CROSS REFERENCE TO RELATED APPLICATIONS

This is a U.S. National Phase Application under 35 U.S.C. § 371 of International Application No. PCT/JP2017/037532, filed Oct. 17, 2017, which claims priority to Japanese Application Nos. 2016-206182, filed Oct. 20, 2016 and 2017-192971, filed Oct. 2, 2017, which was published Under PCT Article 21(2), the entire contents of which are incorporated herein by reference.

TECHNICAL FIELD

The present invention relates to a plied cord used for a tension member of a power-transmission belt (particularly, a V-ribbed belt), or the like and a method for manufacturing the same, and the power-transmission belt and a method of using the same.

BACKGROUND ART

High tensile strength and bending fatigue resistance are required for a cord which forms a tension member of a V-ribbed belt, and particularly, an aramid cord has been used in high load applications. The aramid cord is generally manufactured by primarily twisting fiber bundles, and secondarily twisting together several bundles of the primarily-twisted fiber bundles. However, the characteristics required for the aramid cord have an antinomic relationship in that when the bending fatigue resistance is improved by increasing the number of twists of the cord, the tensile strength conversely deteriorates, and it is difficult to achieve both the characteristics at the same time. Further, in order to meet a demand for high load transmission, a V-ribbed belt for driving an automobile accessory, having a para-aramid cord (a cord obtained by twisting raw yarn of a para-aramid fiber) used as a tension member has been marketed for a long time. However, in recent years, demands for belt strength and the bending fatigue resistance have been increasing due to an appearance of an ISG (Integrated Starter Generator)-mounted engine or the like.

On the other hand, examples of the para-aramid fibers used in the high load transmission applications include para-aramid fibers containing a single repeating unit, typified by Kevlar (registered trademark) or Twaron (registered trademark). However, Technora (registered trademark) which is a copolymerized para-aramid fiber containing a plurality of types of repeating units is superior in the bending fatigue resistance and has been preferably used. However, since there is a problem of cost and supply stability in the copolymerized para-aramid fiber containing a plurality of types of repeating units, it is desired to increase the bending fatigue resistance even in the para-aramid fiber containing a single repeating unit.

If the cord is Lang twisted (twist directions of a primary twist and a secondary twist are the same as each other), the bending fatigue resistance is improved, but there is a problem that popping-out (a phenomenon that the cord jumps out of a lateral surface of a belt) easily occurs under high tension conditions in the case of the Lang twist. There has been known that the phenomenon is estimated to be caused by non-rectilinearity of the cord due to untwisting torque of the Lang twist, and the popping-out is less likely to occur in plied twist (the twist directions of the primary twist and the secondary twist are opposite to each other) in which the untwisting torque is canceled between the primary twist and the secondary twist. Accordingly, it was common that the twist directions of the primary twist and the secondary twist are set to be opposite directions to each other and a twist factor of the primary twist (a primary twist factor) and a twist factor of the secondary twist (a secondary twist factor) are made substantially equal to each other to prevent the cord from kinking by itself.

In contrast, Japanese Patent No. 4694616 (Patent Document 1) discloses a cord, as a load carrier cord of a multi V-ribbed belt having a good balance between a load carrying capability and the bending fatigue resistance, which includes a plurality of yarns having a first twist corresponding to a first twist multiplier and a first twist direction, and has a second twist corresponding to a second twist multiplier in a direction opposite to the first twist direction, in which a ratio of the first twist multiplier to the second twist multiplier is greater than about 1.5. In an Example in this document, a cord having a ratio of the first twist multiplier corresponding to the primary twist to the second twist multiplier corresponding to the secondary twist being 2.5 (that is, the second twist multiplier/the first twist multiplier=0.4) is manufactured by using a para-aramid fiber of 1000 denier as a base yarn.

Japanese Patent No. 5750561 (Patent Document 2) discloses a cord, as a cord of a power-transmission belt excellent in bending fatigue resistance, configured by a plied yarn with a total fineness of 4000 to 5000 dtex which includes four primarily-twisted yarns, each being obtained by subjecting a bundle of para-aramid fibers with a fineness of 1000 to 1250 dtex to a primary twist in one direction at a twist factor of 1200 to 1350 in which the four primarily-twisted yarns is subjected to a secondary twist in an opposite direction to the primary twist at a twist factor of 900 to 1100. In this document, it is described that a ratio of the secondary twist factor to the primary twist factor (the secondary twist factor/the primary twist factor) is in a range of 0.5 to 1 in the plied yarn configuring the cord, and in Examples, plied cords which have the number of the secondary twists of 14.3 to 17.5, the number of the primary twists of 38.1 to 42.9, and the secondary twist factor/the primary twist factor of 0.67 to 0.92 are manufactured.

However, even these plied cords cannot sufficiently satisfy the bending fatigue resistance in an ISG-mounted engine application. Further, these patent documents do not describe popping-out resistance.

PRIOR ART DOCUMENT

Patent Document

Patent Document 1: Japanese Patent No. 4694616
Patent Document 2: Japanese Patent No. 5750561

SUMMARY OF INVENTION

Problems to be Solved by Invention

The present invention aims to provide a plied cord capable of simultaneously improving tensile strength, bending fatigue resistance and popping-out resistance of a power-transmission belt (particularly, a V-ribbed belt), which uses a para-aramid cord as a tension member, at a high level and a method for manufacturing the same, and the power-transmission belt containing the plied cord as the tension member and a method of using the power-transmission belt.

Means for Solving Problems

As a result of an intensive investigation for solving the problem, the present inventor found out that when a plied cord obtained by preparing a plurality of primarily-twisted yarns with a specific primary twist factor using high elongation type para-aramid fibers, and secondarily twisting the primarily-twisted yarns in such a way that a ratio of a twist factor of the secondary twist to a twist factor of the primary twist is within a certain range, was used as a tension member of a V-ribbed belt, tensile strength, bending fatigue resistance and popping-out resistance of a power-transmission belt such as the V-ribbed belt can be simultaneously improved at a high level, and thereby completed the present invention.

That is, the plied cord according to the present invention is a plied cord including three primarily-twisted yarns containing para-aramid fibers, in which the para-aramid fibers have an average fineness of 1000 to 1250 dtex, a tensile modulus of 55 to 70 GPa and a tensile strength of 2800 to 3500 MPa, and the plied cord has the number of primary twists of the primarily-twisted yarns being 33 to 40 times/10 cm, a secondary twist direction opposite to a primary twist direction and a ratio of a secondary twist factor to a primary twist factor being 0.25 to 1. The number of secondary twists of the plied cord is preferably about 10 to 15 times/10 cm. The ratio of the secondary twist factor to the primary twist factor of the plied cord may be about 0.5 to 0.75.

In addition, the plied cord according to the present invention is a plied cord including four primarily-twisted yarns containing para-aramid fibers, in which the para-aramid fibers have an average fineness of 1000 to 1250 dtex, a tensile modulus of 55 to 70 GPa and a tensile strength of 2800 to 3500 MPa, and the plied cord has the number of primary twists of the primarily-twisted yarns being 42 to 52 times/10 cm, a secondary twist direction opposite to a primary twist direction and a ratio of a secondary twist factor to a primary twist factor being 0.25 to 1. The number of secondary twists of the plied cord is preferably about 5 to 15 times/10 cm. The ratio of the secondary twist factor to the primary twist factor of the plied cord may be about 0.33 to 0.66.

In each of the two types of the plied cords, an average diameter of the plied cord is preferably about 0.7 to 0.9 mm. The para-aramid fibers may be polyparaphenylene terephthalamide fibers.

The present invention also includes a method for manufacturing the plied cord which includes a primary twist step of subjecting the para-aramid fibers to a primary twist in one direction to obtain the primarily-twisted yarn, and a secondary twist step of arranging three or four bundles of the primarily-twisted yarns obtained in the primary twist step and subjecting them to a secondary twist in an opposite direction to the primary twist, to obtain the plied cord.

The present invention also includes a power-transmission belt including a tension member formed of the plied cord. In the power-transmission belt according to the present invention, the tension member may contain a cord and have an average pitch of the cord being preferably about 0.8 to 1.05 mm. The power-transmission belt according to the present invention may further include a compression rubber layer formed of a rubber composition containing a rubber component. The rubber component may be an ethylene-α-olefin elastomer. Besides, the power-transmission belt is preferably a V-ribbed belt.

The present invention further includes a method for using the power-transmission belt for driving an ISG-mounted engine.

Effect of the Invention

According to the present invention, the plied cord obtained by preparing three or four (preferably, three) primarily-twisted yarns with the specific primary twist factor by using high elongation type para-aramid fibers, and secondarily twisting the primarily-twisted yarns in such a way that a ratio of the twist factor of the secondary twist to the twist factor of the primary twist is within a certain range, is used as the tension member of the power-transmission belt (particularly, a V-ribbed belt). Therefore, the tensile strength, the bending fatigue resistance and the popping-out resistance of the power-transmission belt can be simultaneously improved at a high level.

BRIEF DESCRIPTION OF DRAWINGS

FIG. 1 is a schematic cross-sectional view in a belt width direction, illustrating an example of a V-ribbed belt according to the present invention.

FIG. 2 is a schematic view for explaining a method for evaluating bending fatigue resistance of the V-ribbed belts obtained in Examples and Comparative Examples.

DESCRIPTION OF EMBODIMENTS

[Plied Cord]

A plied cord according to the present invention is a plied cord obtained by subjecting para-aramid fibers (aromatic polyamide fibers) to a primary twist in one direction to form a primarily-twisted yarn (strand), arranging three or four bundles (preferably, three bundles) of the primarily-twisted yarns and subjecting them to a secondary twist in an opposite direction to the primary twist, and can be used as a tension member of a power-transmission belt (particularly, a V-ribbed belt). In the present invention, since a ply-twist in which primary twist and secondary twist are made opposite directions to each other is employed, untwisting torque is canceled between the primary twist and the secondary twist so that popping-out resistance can be improved. Further, from viewpoints that a balance of tensile strength, bending fatigue resistance, popping-out resistance, economic efficiency or the like of the power-transmission belt is excellent, and the popping-out resistance can be improved to a high degree, three bundles of the primarily-twisted yarns are preferable.

A raw yarn of the primarily-twisted yarn is generally a para-aramid multifilament yarn containing the para-aramid fibers. Further, the para-aramid multifilament yarn may be any yarn as long as it contains a monofilament yarn of the para-aramid fiber, and if necessary, may also contain a monofilament yarn of another fiber (a polyester fiber, or the like). A proportion of the para-aramid fibers is 50% by mass or more (particularly, 80 to 100% by mass) based on the entirety of monofilament yarns (multifilament yarn), and in general, all monofilament yarns are configured by the para-aramid fibers.

The para-aramid fiber used as the raw yarn may be a copolymerized para-aramid fiber containing a plurality of types of repeating units (for example, "Technora" manufactured by Teijin Ltd., which is a copolymerized aramid fiber of polyparaphenylene terephthalamide and 3,4'-oxydiphenylene terephthalamide, and the like). However, from viewpoints that economic efficiency and availability are excellent and the effect of the present invention is remarkably expressed, a para-aramid fiber containing a single repeating unit (for example, "Twaron" manufactured by Teijin Ltd., "Kevlar" manufactured by Toray Du Pont Co., Ltd., which are a polyparaphenylene terephthalamide fiber, and the like) is preferable.

The para-aramid fibers used as the raw yarn have a tensile modulus of 55 to 70 GPa, preferably 58 to 68 GPa, and more preferably about 60 to 65 GPa. In the case where the tensile modulus is excessively small, elongation of the belt becomes large at a high load, whereas in the case of excessively large, it becomes difficult to balance the tensile strength, bending fatigue resistance and popping-out resistance, and particularly, the bending fatigue resistance deteriorates. Incidentally, in the present specification and claims, the tensile modulus is measured by a method of, in accordance with the method described in JIS L1013 (2010), measuring a load-elongation curve and determining an average slope of a region with a load of 1000 MPa or less.

The para-aramid fibers used as the raw yarn have a tensile strength of 2800 to 3500 MPa, preferably 2850 to 3400 MPa (for example, 2900 to 3300 MPa), and more preferably about 3000 to 3200 MPa. In the case where the tensile strength is excessively small, it becomes difficult to balance the tensile strength, bending fatigue resistance and popping-out resistance, and particularly, the tensile strength of the belt deteriorates. Incidentally, in the present specification and claims, the tensile strength is measured in accordance with the method described in JIS L1013 (2010). Besides, as described in this standard, when measuring the tensile strength of a non-twisted multifilament, measurement is performed by twisting 8 times per 10 cm.

For the para-aramid fibers containing a single repeating unit and having these mechanical characteristics, a commercially available product such as "Twaron 2100" manufactured by Teijin Ltd., or "Kevlar 119" manufactured by Toray Du Pont Co., Ltd. can be used as the high elongation type para-aramid fibers. In the present invention, high tensile strength and tensile modulus can be imparted to a V-ribbed belt by preparing the plied cord by using the high elongation type para-aramid fibers.

The para-aramid fibers used as the raw yarn have an average fineness of 1000 to 1250 dtex, preferably 1050 to 1200 dtex, and more preferably about 1080 to 1150 dtex. In the case where the fineness is excessively small, the tensile strength of the belt deteriorates, whereas in the case of excessively large, the bending fatigue resistance deteriorates.

The number of twists in the primary twist (the number of primary twists) of the plied cord can be selected according to the number of the primarily-twisted yarns. In the plied cord containing three primarily-twisted yarns, from a viewpoint of imparting excellent bending fatigue resistance and tensile strength, the number of the primary twists is 33 to 40 times/10 cm, preferably 35 to 39.5 times/10 cm (for example, 36 to 39.3 times/10 cm), and more preferably about 37 to 39 times/10 cm (particularly, 38 to 38.5 times/10 cm). On the other hand, in the plied cord containing four primarily-twisted yarns, from a viewpoint of imparting excellent bending fatigue resistance and tensile strength, the number of the primary twists is 42 to 52 times/10 cm, preferably 42.5 to 51.8 times/10 cm (for example, 43 to 51.5 times/10 cm), and more preferably about 46.1 to 51 times/10 cm (particularly, 46.5 to 50.5 times/10 cm). In the case where the number of the primary twists is excessively small, the bending fatigue resistance deteriorates, whereas in the case of excessively large, the tensile strength deteriorates.

The number of twists in the secondary twist (the number of secondary twists) of the plied cord can also be selected from the range of about 5 to 20 times/10 cm (particularly 5 to 19 times/10 cm) according to the number of the primarily-twisted yarns. Particularly, in the plied cord containing three primarily-twisted yarns, the number of the secondary twists is, for example, 10 to 19 times/10 cm (for example, 10 to 15 times/10 cm), preferably 12 to 15 times/10 cm (for example, 13 to 15 times/10 cm), and more preferably about 14 to 15 times/10 cm (particularly, 14.5 to 15 times/10 cm). On the other hand, in the plied cord containing four primarily-twisted yarns, the number of the secondary twists is, for example, 5 to 19 times/10 cm (for example, 5 to 15 times/10 cm), preferably 6 to 16 times/10 cm (for example, 8.2 to 14.2 times/10 cm), and more preferably about 9 to 14 times/10 cm (particularly, 9.6 to 12.8 times/10 cm), and may further be, about 10 to 12 times/10 cm. By adjusting the number of the secondary twists in the above-described range, it is possible to appropriately maintain a ratio of a twist factor in the secondary twist (a secondary twist factor) to a twist factor in the primary twist (a primary twist factor). Particularly, in the plied cord containing three primarily-twisted yarns, the popping-out resistance can be improved to a high degree by increasing the number of the secondary twists. In the case where the number of the secondary twists is excessively small, the popping-out resistance may deteriorate, whereas in the case of excessively large, the tensile strength may deteriorate or the bending fatigue resistance may deteriorate.

In the plied cord, the ratio of the secondary twist factor to the primary twist factor (the secondary twist factor/the primary twist factor) can also be selected from the range of about 0.25 to 1 (for example, 0.3 to 0.8) according to the number of the primarily-twisted yarns. Particularly, in the plied cord containing three primarily-twisted yarns, the factor ratio is, for example, 0.5 to 0.75, preferably 0.6 to 0.73, and more preferably about 0.65 to 0.7. On the other hand, in the plied cord containing four primarily-twisted yarns, the factor ratio is, for example, 0.33 to 0.66, preferably 0.35 to 0.6, and more preferably about 0.36 to 0.55 (particularly, 0.38 to 0.5), and may be 0.45 to 0.53. In the present invention, excellent bending fatigue resistance and popping-out resistance can be imparted by setting the twist directions of the primary twist and the secondary twist to be opposite directions to each other and adjusting the ratio of the secondary twist factor to the primary twist factor within the above-described range. Particularly, in the plied cord containing three primarily-twisted yarns, the popping-out resistance can be improved to a high degree by setting the factor ratio close to 1. In the case where the ratio of the secondary twist factor to the primary twist factor is excessively small, the popping-out resistance deteriorates, whereas in the case of excessively large, the bending fatigue resistance deteriorates. Incidentally, in the present specification and claims, each twist factor of the primary twist factor and the secondary twist factor is calculated based on the following Formula.

$$\text{Twist Factor}(T.F.) = [\text{the number of twist (times}/m) \times \sqrt{\text{total fineness}(tex)}]/960$$

The primary twist factor and the secondary twist factor of the plied cord are not particularly limited as long as they satisfy the above-described ratio of them, but the primary twist factor is, for example, 4 to 6, preferably 4.5 to 5.5, and more preferably about 4.8 to 5.3, and the secondary twist factor is, for example, 1.5 to 3.5, preferably 1.8 to 3, and more preferably about 2 to 2.5.

The plied cord has an average diameter (diameter) of, for example, 0.5 to 1.2 mm, preferably 0.6 to 1 mm, and more preferably about 0.7 to 0.9 mm (particularly, 0.78 to 0.88 mm). Particularly, in an ISG-mounted engine, there are severe demands on belt strength and bending fatigue resistance. The diameter of the cord is preferably thicker in order to increase the belt strength, whereas in the case of excessively thick, the bending fatigue resistance deteriorates. Therefore, it is preferable to be adjusted within the above-described range. In the case where the average diameter of the plied cord is excessively small, the tensile strength and the tensile modulus may deteriorate, whereas in the case of excessively large, the bending fatigue resistance may deteriorate.

In the case where the plied cord is a multifilament yarn, the plied cord may have an average fineness of, for example, 2000 to 7000 dtex, preferably 3000 to 6000 dtex, and more preferably about 4000 to 5000 dtex. The multifilament yarn may contain, for example, 1000 to 6000 yarns, preferably 2000 to 5000 yarns, and more preferably about 2500 to 4500 yarns of monofilament yarns.

The plied cord may have a tensile strength of, for example, 600 N or more (particularly, 650 N or more), and is preferably 600 to 1000 N, and more preferably about 650 to 900 N (particularly, 700 to 800 N). In the case where the tensile strength of the plied cord is excessively small, the tensile strength and the popping-out resistance of the belt may deteriorate. Incidentally, in the present specification and claims, the tensile strength of the plied cord is measured by the method described in Examples described later.

The plied cord according to the present invention can be manufactured through a primary twist step of subjecting the para-aramid fibers to a primary twist in one direction to obtain the primarily-twisted yarn, and a secondary twist step of arranging three or four bundles of the primarily-twisted yarns obtained in the primary twist step and subjecting them to a secondary twist in an opposite direction to the primary twist, to obtain the plied cord, based on conventional technique.

[Power-Transmission Belt]

A power-transmission belt according to the present invention may be any belt as long as it include a tension member formed by the above-described plied cord, and usually includes the plied cords as cords. Examples of the power-transmission belt include a frictional power-transmission belt such as a V belt and a V-ribbed belt, a meshing power-transmission belt such as a toothed belt and a double-sided toothed belt, and the like. Since the tensile strength, the bending fatigue resistance and the popping-out resistance can be simultaneously improved at a high level, the plied cord according to the present invention can be particularly suitably used as a cord of a V-ribbed belt for driving an ISG-mounted engine. Hereinafter, a form of the V-ribbed belt will be described.

The form of the V-ribbed belt that is an example of the present invention is not particularly limited as long as it includes a plurality of V-rib portions extending in parallel to each other along a belt longitudinal direction. For example, a form illustrated in FIG. 1 is exemplified. FIG. 1 is a schematic sectional view in a belt width direction, illustrating an example of the V-ribbed belt according to the present invention. The V-ribbed belt illustrated in FIG. 1 has a form in which a compression rubber layer 2, an adhesion rubber layer 4 in which cords 1 are embedded in the belt longitudinal direction, and a tension layer 5 configured by a cover fabric (a woven fabric, a knitted fabric, a non-woven fabric, or the like) or a rubber composition are laminated in this order from a lower surface (an inner peripheral surface) of the belt to an upper surface (a back surface) of the belt. The compression rubber layer 2 is provided with a plurality of grooves having a V-shaped cross-section extending in the belt longitudinal direction, and a plurality of V-rib portions 3 (four portions in the example illustrated in FIG. 1) having a V-shaped cross-section (inverted trapezoidal shape) are formed between the grooves. Two inclined surfaces (surfaces) of the V-rib portion 3 form a frictional power-transmission surface and come into contact with a pulley to transmit power (frictional power-transmission).

The V-ribbed belt is not limited to this form, and may have any form as long as it is provided with a compression rubber layer having a power-transmission surface at least a part of which is capable of coming into contact with a V-rib groove (V-groove portion) of the pulley, and typically may include a tension layer, a compression rubber layer, and a cord embedded therebetween along the belt longitudinal direction. In the V-ribbed belt according to the present invention, for example, the cords 1 may be embedded between the tension layer 5 and the compression rubber layer 2 without providing the adhesion rubber layer 4. Further, the adhesion rubber layer 4 may be provided on one of the compression rubber layer 2 and the tension layer 5, and the cords 1 may be embedded between the adhesion rubber layer 4 (compression rubber layer 2 side) and the tension layer 5 or between the adhesion rubber layer 4 (tension layer 5 side) and the compression rubber layer 2.

At least the compression rubber layer 2 is preferably formed of a rubber composition described in detail below. The adhesion rubber layer 4 may be formed of a conventional rubber composition used as an adhesive rubber layer, the tension layer 5 may be formed of a conventional cover fabric or rubber composition used as a tension layer, and they may not be formed of the same rubber composition as that of the compression rubber layer 2.

The V-ribbed belt may have a tensile strength of, for example, 6000 N or more (particularly, 6500 N), and is preferably 6000 to 9000 N, and more preferably about 6500 to 8000 N (particularly, 7000 to 7500 N). In the case where the tensile strength is excessively small, there is a high possibility that the belt will be broken during traveling. In the present specification and claims, the tensile strength of the V-ribbed belt is measured by the method described in Examples described later.

(Cord)

In the adhesion rubber layer 4, a plurality of cords 1 are arranged so as to each extend in the belt longitudinal direction and be spaced apart from each other at a predetermined pitch in the belt width direction.

An average pitch (an average distance between the adjacent cords) of the cords can be appropriately selected according to a cord diameter and the intended belt tensile strength, and can be selected from a range of, for example 0.6 to 2 mm, preferably 0.8 to 1.5 mm, and more preferably about 0.8 to 1.05 mm. Further, the average pitch of the cords may be selected according to the number of the primarily-twisted yarns. Particularly, in the plied cord containing three primarily-twisted yarns, the average pitch of the cords is, for example, 0.7 to 1 mm, preferably 0.75 to 0.95 mm, and more preferably about 0.8 to 0.9 mm. On the other hand, in the plied cord containing four primarily-twisted yarns, the average pitch of the cords is, for example, 0.8 to 1.2 mm, preferably 0.9 to 1.05 mm, and more preferably about 0.9 to 1 mm. In the case where the pitch of the cords is excessively small, the cords may run on each other in a belt manufacturing process, whereas in the case of excessively large, the tensile strength and the tensile modulus of the belt may deteriorate.

The cord may be either S-twisted or Z-twisted, but it is preferable that the S-twisted cord and the Z-twisted cord are alternately arranged in order to enhance rectilinearity of the belt.

The cord may be subjected to a conventional adhesion treatment (or a surface treatment), and may be treated with a treatment liquid containing a resorcinol-formalin-latex (RFL) solution or an isocyanate compound, for example. Further, the cord may be coated by a rubber composition containing a rubber component configuring the adhesion rubber layer.

(Rubber Composition)

The compression rubber layer 2, the adhesion rubber layer 4 and the tension layer 5 may be formed of a rubber composition containing a rubber component. Particularly, by forming the compression rubber layer with the rubber composition, it is possible to impart excellent quietness and power transmission performance, and by forming the compression rubber layer and the adhesion rubber layer with the rubber composition, it is possible to perform adhesion treatment with the para-aramid cord by using an existing method.

As the rubber component, vulcanizable or cross-linkable rubbers may be used, and examples thereof include diene rubbers (natural rubbers, isoprene rubbers, butadiene rubbers, chloroprene rubbers, styrene-butadiene rubbers (SBR), acrylonitrile butadiene rubbers (nitrile rubbers), hydrogenated nitrile rubbers, and the like), ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, fluororubbers, and the like. These rubber components can be used alone or in combination of two or more thereof. Preferred rubber components are ethylene-α-olefin elastomers (ethylene-propylene copolymer (EPM), ethylene-propylene-diene terpolymer (EPDM), and the like) and chloroprene rubbers. Further, from a viewpoint of having no harmful halogen, having ozone resistance, heat resistance, cold resistance, and weather resistance, and capable of reducing belt weight, ethylene-α-olefin elastomers (ethylene-propylene copolymer (EPM), ethylene-propylene-diene terpolymer (EPDM), and the like) are particularly preferable. In the case where the rubber component contains an ethylene-α-olefin elastomer, a proportion of the ethylene-α-olefin elastomer in the rubber component may be 50% by mass or more (particularly, 80% to 100% by mass), and is particularly preferably 100% by mass (only the ethylene-α-olefin elastomer).

The rubber composition may further contain short fibers. Examples of the short fibers include synthetic fibers such as polyolefin fibers (polyethylene fibers, polypropylene fibers, and the like), polyamide fibers (polyamide 6 fibers, polyamide 66 fibers, polyamide 46 fibers, aramid fibers, and the like), polyalkylene arylate fibers (for example, $C_{2-4}$ alkylene $C_{8-14}$ arylate fibers such as polyethylene terephthalate (PET) fibers and polyethylene naphthalate (PEN) fibers), vinylon fibers, polyvinyl alcohol fibers, and polyparaphenylene benzobisoxazole (PBO) fibers; natural fibers such as cotton, hemp and wool; inorganic fibers such as carbon fibers, and the like. These short fibers can be used alone or in combination of two or more thereof. In order to improve dispersibility and adhesiveness in the rubber composition, the short fibers may be subjected to a conventional adhesion treatment (surface treatment) in the same manner as in the cords.

The rubber composition may further contain conventional additives. Examples of the conventional additives include vulcanizing agents or cross-linking agents (or crosslinkers) (sulfur vulcanizing agents, and the like), co-crosslinking agents (bismaleimides, and the like), vulcanization aids or vulcanization accelerators (thiuram accelerators, and the like), vulcanization retardants, metal oxides (zinc oxide, magnesium oxide, calcium oxide, barium oxide, iron oxide, copper oxide, titanium oxide, aluminum oxide, and the like), enhancers (for example, carbon black and silicon oxide such as hydrated silica), fillers (clay, calcium carbonate, talc, mica, and the like), softeners (for example, oils such as paraffin oil and naphthenic oil), processing agents or processing aids (stearic acid, stearic acid metal salts, wax, paraffin, fatty acid amide, and the like), anti-aging agents (antioxidants, thermal-aging inhibitors, anti-flex-cracking agents, antiozonants, and the like), colorants, tackifiers, plasticizers, coupling agents (silane coupling agents, and the like), stabilizers (ultraviolet absorbers, thermal stabilizers, and the like), flame retardants, antistatic agents, or the like. These additives can be used alone or in combination of two or more thereof. Besides, the metal oxides may function as cross-linking agents. Moreover, particularly, the rubber composition configuring the adhesion rubber layer 4 may contain an adhesiveness improving agent (a resorcin-formaldehyde cocondensate material, an amino resin, or the like).

The rubber compositions configuring the compression rubber layer 2, the adhesion rubber layer 4 and the tension layer 5 may be the same as each other or may be different from each other. Similarly, the short fibers contained in the compression rubber layer 2, the adhesion rubber layer 4 and the tension layer 5 may be the same as each other or may be different from each other.

(Cover Fabric)

The tension layer 5 may be formed of a cover fabric. The cover fabric can be formed of, for example, a cloth material (preferably a woven fabric) such as a woven fabric, a wide angle fabric, a knitted fabric, and a nonwoven fabric, or the like. If necessary, the tension layer 5 may be laminated on the compression rubber layer and/or the adhesion rubber layer in the form described above, after an adhesion treatment such as a treatment with RFL liquid (immersion treatment, or the like), friction for rubbing an adhesive rubber into the cloth material, or lamination (coating) of the adhesive rubber and the cloth material.

[Method for Manufacturing V-Ribbed Belt]

A method for manufacturing a V-ribbed belt, which is an example of the present invention, is not particularly limited, and known or conventional methods can be adopted. For example, the compression rubber layer 2, the adhesion rubber layer 4 in which the cords 1 are embedded, and the tension layer 5 are respectively formed of unvulcanized rubber compositions and laminated, the laminated body is formed into a tubular shape with a forming die and vulcanized to form a sleeve, and the vulcanized sleeve is cut into a predetermined width, so that the V-ribbed belt can be formed. More specifically, a V-ribbed belt can be manufactured by the following methods.

(First Manufacturing Method)

First, a sheet for the tension layer is wound around a smooth-surfaced cylindrical forming mold (mold or forming die), the cords (twisted cord) for forming a tension member are spirally spun on the sheet, and further, a sheet for the adhesion rubber layer and a sheet for the compression rubber layer are sequentially wound thereon to manufacture a formed body. Subsequently, the forming mold is accommodated in a vulcanizer in a state where a vulcanization jacket is covered on the formed body, vulcanization is performed under a predetermined vulcanization condition, and then the formed body is demolded from the forming mold to obtain a tubular vulcanized rubber sleeve. Further, an outer surface (compression rubber layer) of the vulcanized rubber sleeve is ground by a grinding wheel to form a plurality of ribs, and then by using a cutter, the vulcanized rubber sleeve is cut in the peripheral direction at a predetermined width to finish the V-ribbed belt. Incidentally, by inverting the cut belt, the V-ribbed belt including the compression rubber layer having the rib portions on the inner peripheral surface thereof is obtained.

(Second Manufacturing Method)

First, a cylindrical inner mold in which a flexible jacket is attached on an outer peripheral surface thereof is used as an inner mold, a sheet for the tension layer is wound around the flexible jacket on the outer peripheral surface, and the cords for forming a tension member are spirally spun the sheet, and a sheet for the compression rubber layer is further wound thereon to manufacture a laminated body. Next, a cylindrical outer mold in which a plurality of rib molds are engraved on the inner peripheral surface thereof is used as an outer mold which is attachable to the inner mold, and the inner mold around which the laminated body is wound is concentrically installed in the outer mold. Subsequently, the flexible jacket is expanded toward the inner peripheral surface (rib mold) of the outer mold, and the laminated body (compression rubber layer) is press-fitted into the rib mold and vulcanized. Further, the inner mold is removed from the outer mold, the vulcanized rubber sleeve having a plurality of ribs is demolded from the outer mold, and then by using a cutter, the vulcanized rubber sleeve is cut in the peripheral direction at a predetermined width to finish a V-ribbed belt. In the second manufacturing method, the laminated body including the tension layer, the tension member and the compression rubber layer can be expanded at one to finish into a sleeve (or a V-ribbed belt) having the plurality of ribs.

(Third Manufacturing Method)

In connection with the second manufacturing method, for example, the method (method in which only the compression rubber layer is expanded to form a preformed body (semi-vulcanized state), the tension layer and the tension member are expanded to be pressure-bonded to the preformed body, and then vulcanization and integration are performed to finish the V-ribbed belt) disclosed in JP-A-2004-82702 may be adopted.

EXAMPLES

Hereinafter, the present invention will be explained in more detail based on Examples, but the present invention is not limited to the Examples. Incidentally, details of raw materials used in the Examples and evaluation methods for the measured evaluation items are shown below.

[Raw Materials]

High elongation type para-aramid fiber containing a single repeating unit: "Twaron (registered trademark) 2100" manufactured by Teijin Ltd., tensile modulus of 62 GPa, tensile strength of 3100 MPa Standard type para-aramid fiber containing a single repeating unit: "Twaron (registered trademark) 1014" manufactured by Teijin Ltd., tensile modulus of 82 GPa, tensile strength of 2800 MPa Pre-dip treatment liquid: Toluene solution containing polymeric isocyanate in a proportion of 10% by mass Resorcinol-formalin-latex (RFL) treatment liquid: Mixed liquid of 4 parts by mass of prepolymer of resorcin and formalin (2.6 parts by mass of resorcin and 1.4 parts by mass of formalin), 17.2 parts by mass of latex (styrene-butadiene-vinylpyridine copolymer, manufactured by Nippon Zeon Co., Ltd.), and 78.8 parts by mass of water Overcoat treatment liquid: Mixed liquid of 9.3 parts by mass of rubber composition for adhesion rubber layer shown in Table 1, 0.7 parts by mass of polymeric isocyanate, and 90 parts by mass of toluene EPDM: "IP3640" manufactured by Dupont Dow Elastomers Japan Ltd., Mooney viscosity of 40 (100° C.)

Carbon HAF: "SEAST 3" manufactured by Tokai Carbon Co., Ltd.

Hydrous silica: "Nipsil VN3" manufactured by Tosoh Silica Co., Ltd., BET specific surface area of 240 $m^2/g$ Resorcin-formaldehyde condensate: less than 20% of resorcinol and less than 0.1% of formalin Anti-aging agent: "NONFLEX OD3" manufactured by Seiko Chemical Co., Ltd.

Vulcanization accelerator DM: di-2-benzothiazolyl disulfide

Polyamide short fiber: "66 Nylon" manufactured by Asahi Kasei Co., Ltd.

Paraffin softener "Diana Process Oil" manufactured by Idemitsu Kosan Co., Ltd.

Organic peroxides: "Perkadox 14RP" manufactured by Kayaku Akzo Co., Ltd.

Examples 1 to 11 and Comparative Examples 1 to 12

[Cord Fabrication]

For cords used in Examples 1 to 7 and Comparative Examples 1 to 4, multifilament (fineness of 1100 dtex) of the high elongation type para-aramid fiber containing a single repeating unit was primarily twisted in one direction with the number of the primary twists shown in Table 3, and the four primarily-twisted yarns were arranged and secondarily twisted in an opposite direction to the primary twist with the number of secondary twists shown in Table 3 to manufacture plied cords (S twist and Z twist) each having a total fineness of 4400 dtex. The obtained plied cord was immersed in the pre-dip treatment liquid for 10 seconds, and then subjected to a heat treatment at 180° C. for 4 minutes. Next, the pre-dipped plied cord was immersed in the RFL treatment liquid for 10 seconds, and then subjected to a heat treatment at 230° C. for 2 minutes. Further, the plied cord subjected to the RFL treatment was immersed in the overcoat treatment liquid for 3 seconds, and then subjected to a heat treatment at 150° C. for 4 minutes, to thereby obtain a treated cord coated with an adhesive rubber. On the other hand, for cords used in Comparative Examples 5 to 7, treated cords were manufactured in the same manner as in Examples 1 to 7 and Comparative Examples 1 to 4, except that the standard type para-aramid fiber containing a single repeating unit was used. Meanwhile, for cords used in Examples 8 to 11 and Comparative Examples 8 to 12, treated cords were manufactured in the same manner as in Examples 1 to 7 and Comparative Examples 1 to 4, except that the multifilament of the high elongation type para-aramid fiber containing a single repeating unit was primarily twisted in one direction with the number of the primary twists shown in Table 4, and the three primarily-twisted yarns were arranged and secondarily twisted in an opposite direction to the primary twist with the number of secondary twists shown in Table 4 to manufacture plied cords (S twist and Z twist) each having a total fineness of 3300 dtex. A cord diameter of the treated cords obtained in Examples 1 to 7 and Comparative Examples 1 to 7 was diameter 4) 0.82 mm, and a cord diameter of the treated cords obtained in Examples 8 to 11 and Comparative Examples 8 to 12 was diameter 4) 0.72 mm

[Tensile Strength of Treated Cord]

One of the obtained treated cords was pulled under a condition of a tensile speed of 50 mm/min by using an autograph ("AGS-J 10 kN" manufactured by Shimadzu Corporation), and the strength of the treated cord at break was measured. The tensile strength of the treated cords was evaluated based on strength values thereof according to the following criteria, and the results are shown in Tables 3 and 4.

A: 650 N or more (high tensile strength)

B: 600 N or more and less than 650 N (without practical problem)

C: less than 600 N (with practical problem)

[Manufacture of V-Ribbed Belt]

First, a rubber-attached cotton fabric of one ply (one layer) was wound around an outer periphery of a smooth-surfaced cylindrical forming mold, and an unvulcanized sheet for the adhesion rubber layer, formed of the rubber composition shown in Table 1 was wound around the outside of the cotton fabric. Subsequently, on the sheet for the adhesion rubber layer, the two treated cords (S twist and Z twist) were spirally spun and wound in a state where the S twist-treated cord and the Z twist-treated cord were arranged in parallel at a pitch of 0.95 mm or 0.85 mm, and an unvulcanized sheet for the adhesion rubber layer formed of the rubber composition and an unvulcanized sheet for the compression rubber layer formed of the rubber composition shown in Table 2 were further wound thereon in this order. In a state where a vulcanization jacket was arranged at an outer side the sheet for the compression rubber layer, the forming mold was put into a vulcanizer to perform vulcanization. A tubular vulcanized rubber sleeve obtained by the vulcanization was removed from the forming mold, the compression rubber layer of the vulcanized rubber sleeve was ground by a grinder to form a plurality of V-shaped grooves simultaneously, and then the vulcanized rubber sleeve was cut in a peripheral direction by a cutter so as to be round-sliced, thereby obtaining a V-ribbed belt with a circumferential length of 1100 mm having three ribs (in a sectional view in the direction shown in FIG. 1, the S twist-treated cord and the Z twist-treated cord were alternatively arranged in the obtained belt).

TABLE 1

(Composition for Adhesion Rubber Layer)

| Component | Parts by mass |
| --- | --- |
| EPDM | 100 |
| Stearic acid | 1 |
| Zinc oxide | 5 |
| Carbon HAF | 35 |
| Hydrous silica | 20 |
| Resorcin-formaldehyde condensate | 2 |
| Anti-aging agent | 2 |
| Vulcanization accelerator DM | 2 |
| Hexamethoxy methylol melamine | 2 |
| Sulfur | 1 |
| Sum total | 170 |

TABLE 2

(Composition for Compression Rubber Layer)

| Component | Parts by mass |
| --- | --- |
| EPDM | 100 |
| Polyamide short fiber | 15 |
| Cotton short fiber | 25 |
| Zinc oxide | 5 |
| Stearic acid | 1 |
| Mercaptobenzimidazole | 1 |
| Carbon HAF | 60 |
| Paraffin softener | 10 |
| Organic peroxides | 4 |
| Dibenzoylquinone dioxime | 2 |
| Sum total | 223 |

[Tensile Strength of Belt]

By using a universal tester ("UH-200 kNX" manufactured by Shimadzu Corporation), the obtained V-ribbed belt was pulled under a condition of a tensile speed of 50 mm/min, and the strength of the V-ribbed belt at break was measured. The tensile strength of the V-ribbed belt was evaluated based on strength values thereof according to the following criteria, and the results are shown in Tables 3 and 4.

A: 6000 N or more (high tensile strength)

B: 5700 N or more and less than 6000 N (without practical problem)

C: less than 5700 N (with practical problem)

[Bending Fatigue Resistance]

As illustrated in FIG. 2, the obtained V-ribbed belt was wound around a driving pulley 11 (diameter of 120 mm and rotation speed of 4900 rpm), a driven pulley 12 (diameter of 120 mm and load of 8.8 kW), an idler pulley 13 (diameter of 85 mm), and a tension pulley 14 (diameter of 45 mm and axial load of 60 kgf (constant)), and traveled 200 hours at an atmospheric temperature of 120° C. By using the universal tester ("UH-200 kNX" manufactured by Shimadzu Corporation), the tensile strength of the belt before and after the belt travelling test was measured by pulling the belt under a condition of a tensile speed of 50 mm/min, and the strength of the belt at break was measured. A strength retention rate was calculated by the following Formula. Further, the results of evaluating the calculated strength retention rate according to the following criteria are shown in Tables 3 and 4.

Strength retention rate(%)=(strength after bending test/strength before bending test)×100

(Evaluation of Strength Retention Rate)

A: The strength retention rate is 85% or more (good bending fatigue resistance).

B: The strength retention rate is 80% or more and less than 85% (without practical problem).

C: The strength retention rate is less than 80% (with practical problem).

[Popping-out Resistance]

In the evaluation of the popping-out resistance, it was judged that popping-out occurred when the cord jumped from a side surface of the belt by 5 mm or more in a high tension test and an over tension test described below. Belt travelling test conditions of the high tension test and the over tension test were the same as the belt travelling test conditions in the evaluation of the bending fatigue resistance described above except for an axial load. The axial load in the high tension test was 82 kgf, and the axial load in the over tension test was 104 kgf. The results of evaluating the results of the high tension test and the over tension test according to the following criteria are shown in Tables 3 and 4.

A: Popping-out did not occur in both tests (good popping-out resistance).

B: Although the popping-out occurred in the over tension test, the popping-out did not occur in the high tension test (without practical problem).

C: Popping-out occurred in both tests (with practical problem).

[Comprehensive Judgment]

The results of evaluating the results of the tensile strength, the bending fatigue resistance and the popping-out resistance according to the following criteria are also shown in Tables 3 and 4.

A: In the evaluation items, two or more "A" without "C" (the tensile strength, the bending fatigue resistance and the popping-out resistance are simultaneously achieved at a high level).

C: In the evaluation items, "C" in any of the respective items, or two or more "B" (the tensile strength, the bending fatigue resistance and the popping-out resistance are not simultaneously achieved at a high level).

TABLE 3

|  |  | Examples |  |  |  |  |  |  | Comparative Examples |
|---|---|---|---|---|---|---|---|---|---|
|  |  | 1 | 2 | 3 | 4 | 5 | 6 | 7 | 1 |
| Raw yarn type |  | High elongation type |  |  |  |  |  |  |  |
| The number of primarily-twisted yarns |  | 4 |  |  |  |  |  |  |  |
| The number of twists (times/10 cm) | Secondary | 8.2 | 9.6 | 9.6 | 11.4 | 12.8 | 12.8 | 14.2 | 8.2 |
|  | Primary | 50.3 | 50.3 | 46.7 | 46.7 | 46.7 | 43.0 | 43.0 | 54.9 |
| Twist factor | Secondary | 1.8 | 2.1 | 2.1 | 2.5 | 2.8 | 2.8 | 3.1 | 1.8 |
|  | Primary | 5.5 | 5.5 | 5.1 | 5.1 | 5.1 | 4.7 | 4.7 | 6.0 |
|  | Secondary/Primary Ratio | 0.33 | 0.38 | 0.41 | 0.49 | 0.55 | 0.60 | 0.66 | 0.30 |
| Tensile strength of cord (N) |  | A | A | A | A | A | A | A | C |
|  |  | 697 | 676 | 773 | 758 | 737 | 822 | 802 | 597 |
| Pitch of cord (mm) |  | 0.95 |  |  |  |  |  |  |  |
| Tensile strength of belt (N) |  | A | A | A | A | A | A | A | C |
|  |  | 6450 | 6250 | 7150 | 7010 | 6820 | 7600 | 7420 | 5520 |
| Bending fatigue resistance |  | A | A | A | A | A | A | B | A |
| Strength retention rate (%) |  | 88 | 92 | 90 | 93 | 90 | 88 | 84 | 91 |
| Popping-out resistance |  | B | A | A | A | A | A | A | C |
| High tension test |  | No | No | No | No | No | No | No | Yes |
| Over tension test |  | Yes | No | No | No | No | No | No | Yes |
| Comprehensive judgment |  | A | A | A | A | A | A | A | C |

|  |  | Comparative Examples |  |  |  |  |  |
|---|---|---|---|---|---|---|---|
|  |  | 2 | 3 | 4 | 5 | 6 | 7 |
| Raw yarn type |  | High elongation type |  |  | Standard type |  |  |
| The number of primarily-twisted yarns |  |  |  |  |  |  |  |
| The number of twists (times/10 cm) | Secondary | 8.2 | 14.2 | 14.2 | 9.6 | 11.4 | 12.8 |
|  | Primary | 41.2 | 52.2 | 38.4 | 50.3 | 46.7 | 43.0 |
| Twist factor | Secondary | 1.8 | 3.1 | 3.1 | 2.1 | 2.5 | 2.8 |
|  | Primary | 4.5 | 5.7 | 4.2 | 5.5 | 5.1 | 4.7 |
|  | Secondary/Primary Ratio | 0.40 | 0.54 | 0.74 | 0.38 | 0.49 | 0.60 |
| Tensile strength of cord (N) |  | A | C | A | B | A | A |
|  |  | 891 | 590 | 898 | 628 | 700 | 769 |
| Pitch of cord (mm) |  |  |  |  |  |  |  |
| Tensile strength of belt (N) |  | A | C | A | B | A | A |
|  |  | 8240 | 5460 | 8310 | 5810 | 6480 | 7110 |
| Bending fatigue resistance |  | C | A | C | B | C | C |
| Strength retention rate (%) |  | 77 | 90 | 75 | 82 | 79 | 70 |
| Popping-out resistance |  | A | A | A | B | A | A |
| High tension test |  | No | No | No | No | No | No |
| Over tension test |  | No | No | No | Yes | No | No |
| Comprehensive judgment |  | C | C | C | C | C | C |

TABLE 4

|  |  | Examples | | | | Comparative Examples | | | | |
| --- | --- | --- | --- | --- | --- | --- | --- | --- | --- | --- |
|  |  | 8 | 9 | 10 | 11 | 8 | 9 | 10 | 11 | 12 |
| Raw yarn type | | High elongation type | | | | | | | | |
| The number of primarily-twisted yarns | | 3 | | | | | | | | |
| The number of twists | Secondary | 11.1 | 13.2 | 14.8 | 14.8 | 11.1 | 14.8 | 16.4 | 9.5 | 16.4 |
| (times/10 cm) | Primary | 38.4 | 38.4 | 38.4 | 34.8 | 41.2 | 32.0 | 32.0 | 32.0 | 41.2 |
| Twist factor | Secondary | 2.1 | 2.5 | 2.8 | 2.8 | 2.1 | 2.8 | 3.1 | 1.8 | 3.1 |
|  | Primary | 4.2 | 4.2 | 4.2 | 3.8 | 4.5 | 3.5 | 3.5 | 3.5 | 4.5 |
|  | Secondary/Primary Ratio | 0.50 | 0.60 | 0.67 | 0.74 | 0.47 | 0.80 | 0.89 | 0.51 | 0.69 |
| Tensile strength of cord (N) | | A | A | A | A | A | A | A | A | C |
|  | | 644 | 625 | 611 | 639 | 614 | 657 | 620 | 701 | 574 |
| Pitch of cord (mm) | | 0.85 | | | | | | | | |
| Tensile strength of belt (N) | | A | A | A | A | A | A | A | A | C |
|  | | 6550 | 6360 | 6220 | 6500 | 6250 | 6680 | 6310 | 7130 | 5840 |
| Bending fatigue resistance | | A | A | A | A | A | C | C | C | A |
| Strength retention rate (%) | | 87 | 91 | 93 | 90 | 89 | 84 | 77 | 80 | 86 |
| Popping-out resistance | | B | A | A | A | C | A | A | B | A |
| High tension test | | No | No | No | No | Yes | No | No | No | No |
| Over tension test | | Yes | No | No | No | Yes | No | No | Yes | No |
| Comprehensive judgment | | A | A | A | A | C | C | C | C | C |

[Results and Discussion]

As is apparent from Table 3, it can be seen that in the plied cord containing four primarily-twisted yarns, Examples 1 to 7 in which a raw yarn type is a high elongation type, the number of the primary twists is within a range of 43 to 50.3 times/10 cm and the ratio of the secondary twist factor to the primary twist factor is within the range of 0.33 to 0.66, show the comprehensive judgment of "A", achieve the tensile strength, the bending fatigue resistance and the popping-out resistance simultaneously at a high level, and satisfy the performance required for a belt to be mounted on an automobile engine in recent years.

In Comparative Examples 1 and 3, it is presumed that a reason why the tensile strength is low is attributable to a fact that the number of the primary twists is excessively large. Further, in Comparative Examples 2 and 4, it is presumed that a reason why the bending fatigue resistance is low is attributable to a fact that the number of the primary twists is excessively small.

In Examples 1 to 7, it is considered that the tensile strength and the bending fatigue resistance are compatible since the number of primary twists is kept in an appropriate range. Particularly, it can be confirmed that the strength retention rate (bending fatigue resistance) is relatively high in Examples 3 to 5 in which the number of the primary twists is 46.7 times/10 cm.

Next, focusing on the popping-out resistance, since the popping-out occurs in the over tension test and/or the high tension test in Example 1, and Comparative Examples 1 and 5, the determination is "C" or "B". In these three examples, the ratios of the secondary twist factor to the primary twist factor are relatively small as 0.33, 0.30, and 0.38, respectively, and the secondary twist is in a lax state with respect to the primary twist. It is considered that due to this, untwisting torques of the primary twist and the secondary twist are not canceled out, and the rectilinearity of the belt is lowered, leading to the occurrence of popping-out. Regarding Example 1 and Comparative Example 5, the popping-out occurs only in the over tension test, and it is considered that the popping-out does not occur in use under an appropriate tension, and therefore, it is determined that the popping-out resistance is at a level that does not cause any problem. However, it is considered that a layout will becomes more complicated and a load variation will be more increased as in the ISG-mounted engine, and a configuration of Example 4 is more effective for these severe requirements.

Focusing on the case where the ratio of the secondary twist factor to the primary twist factor is large, a value of the ratio of the secondary twist factor to the primary twist factor is 0.74 in Comparative Example 4, but a determination of the bending fatigue resistance is "C". Further, also in Example 7, the ratio of the secondary twist factor to the primary twist factor is a relatively large value of 0.66, but a determination of the bending fatigue resistance is "B", and it is considered that when the value of the ratio of the secondary twist factor to the primary twist factor increases, the bending fatigue resistance tends to decrease. From the above, it can be seen that by keeping the value of the ratio of the secondary twist factor to the primary twist factor within an appropriate range, it is possible to achieve both the popping-out resistance and the bending fatigue resistance. Particularly, in Example 4 in which the ratio of the secondary twist factor to the primary twist factor is 0.49, the strength retention rate (bending fatigue resistance) is the highest.

On the other hand, as can be seen from a fact that comprehensive judgments of Comparative Examples 5 to 7 are all "C", the tensile strength, the bending fatigue resistance and the popping-out resistance cannot be simultaneously achieved at a high level in the case of using the standard type para-aramid fiber containing a single repeating unit as the raw yarn. It can be estimated that the reason for this is because the tensile strength and bending fatigue resistance of the raw yarn itself are low even if the number of twists or the ratio of the secondary twist factor to the primary twist factor is adjusted.

As is apparent from Table 4, it can be seen that in the plied cord containing three primarily-twisted yarns, Examples 8 to 11 in which the number of secondary twists is within a range of 11.1 to 14.8 times/10 cm, and the ratio of the secondary twist factor to the primary twist factor is within a range of 0.50 to 0.74, show the comprehensive judgment of "A", achieve the tensile strength, the bending fatigue resistance and the popping-out resistance simultaneously at a high level, and satisfy the performance required for a belt to be mounted on an automobile engine in recent years. The plied cord containing three primarily-twisted yarns was better in the case where the number of secondary twists was larger and the twist factor ratio was larger as compared with the plied cord containing four primarily-twisted yarns. Further, since the number of twisted yarns is small, it is considered that the tensile strength and the bending fatigue resistance are both achieved by reducing the number of the primary twists and narrowing the pitch of the cords. Particularly, it can be confirmed that in Example 10 in which the number of the secondary twists is 14.8 times/10 cm, and the number of the primary twists is 38.4 times/10 cm, the strength retention rate (bending fatigue resistance) is the highest.

Although there is no difference in data under the current test conditions, it is considered that in the plied cord containing three primarily-twisted yarns, the untwisting torque is reduced by increasing the twist factor ratio (close to 1), and therefore, the popping-out resistance is improved more than that in the plied cord containing four primarily-twisted yarns.

On the other hand, even though the number of secondary twists was appropriate, in Comparative Example 8, since the number of primary twists was excessively large, the popping-out resistance deteriorated, and in Comparative Example 9, since the number of primary twists was excessively small, the bending fatigue resistance deteriorated. Moreover, in Comparative Example 10, since the number of secondary twists was large and the number of primary twists was excessively small, the bending fatigue resistance deteriorated, and in Comparative Example 11, since both the number of secondary twists and the number of primary twists were excessively small, both the bending fatigue resistance and the popping-out resistance deteriorated. Further, in Comparative Example 12, since both the number of secondary twists and the number of primary twists were excessively large, the belt tensile strength decreased.

Although the present invention has been described in detail with reference to specific embodiments, it will be apparent to those skilled in the art that various changes and modifications can be added without departing from the spirit and scope of the present invention.

The present application is based on a Japanese Patent Application No. 2016-206182 filed on Oct. 20, 2016 and a Japanese Patent Application No. 2017-192971 filed on Oct. 2, 2017, contents of which are incorporated herein by reference.

INDUSTRIAL APPLICABILITY

Although the plied cord according to present invention can be used as a tension member of various power-transmission belts [for example, a frictional power-transmission belt such as a V belt and a V-ribbed belt, a meshing power-transmission belt such as a toothed belt and a double-sided toothed belt, and the like], can be suitably used as a cord of a V-ribbed belt, and can be particularly suitably used as a cord of a V-ribbed belt for driving an ISG-mounted engine from a viewpoint of simultaneously improving the tensile strength, the bending fatigue resistance and the popping-out resistance at a high level.

DESCRIPTION OF REFERENCE NUMERALS 1 cord
2 compression rubber layer
3 V-rib portion
4 adhesion rubber layer
5 tension layer

The invention claimed is:

1. A plied cord comprising three primarily-twisted yarns comprising para-aramid fibers,
    wherein the primarily-twisted yarns comprising para-aramid fibers have an average fineness of 1000 to 1250 dtex, a tensile modulus of 55 to 70 GPa and a tensile strength of 2800 to 3500 MPa, and
    the plied cord has a number of primary twists of the primarily-twisted yarns being 33 to 40 times/10 cm, a secondary twist direction opposite to a primary twist direction and a ratio of a secondary twist factor to a primary twist factor being 0.25 to 1.

2. The plied cord according to claim 1,
    wherein a number of secondary twists of the plied cord is 10 to 15 times/10 cm.

3. The plied cord according to claim 1,
    wherein the ratio of the secondary twist factor to the primary twist factor of the plied cord is 0.5 to 0.75.

4. The plied cord according to claim 1,
    wherein the plied cord has an average diameter of 0.7 to 0.9 mm.

5. The plied cord according to claim 1,
    wherein the para-aramid fibers are polyparaphenylene terephthalamide fibers.

6. A method for manufacturing the plied cord described in claim 1, comprising:
    a primary twist step of subjecting the para-aramid fibers to a primary twist in one direction to obtain the primarily-twisted yarn, and
    a secondary twist step of arranging three bundles of the primarily-twisted yarns obtained in the primary twist step and subjecting them to a secondary twist in an opposite direction to the primary twist, to obtain the plied cord.

7. A power-transmission belt comprising a tension member formed of the plied cord described in claim 1.

8. The power-transmission belt according to claim 7,
    wherein the plied cord has an average pitch of the cord of 0.8 to 1.05 mm.

9. The power-transmission belt according to claim 7, further comprising a compression rubber layer formed of a rubber composition comprising a rubber component, wherein the rubber component is an ethylene-α-olefin elastomer.

10. A method for using the power-transmission belt described in claim 7, for driving an ISG-mounted engine.

11. A plied cord comprising four primarily-twisted yarns comprising para-aramid fibers,
    wherein the primarily-twisted yarns comprising para-aramid fibers have an average fineness of 1000 to 1250 dtex, a tensile modulus of 55 to 70 GPa and a tensile strength of 2800 to 3500 MPa, and
    the plied cord has a number of primary twists of the primarily-twisted yarns being 42 to 52 times/10 cm, a secondary twist direction opposite to a primary twist direction and a ratio of a secondary twist factor to a primary twist factor being 0.25 to 1.

12. The plied cord according to claim 11,
    wherein a number of secondary twists of the plied cord is 5 to 15 times/10 cm.

13. The plied cord according to claim 11,
    wherein the ratio of the secondary twist factor to the primary twist factor of the plied cord is 0.33 to 0.66.

14. The plied cord according to claim 11,
    wherein the plied cord has an average diameter of 0.7 to 0.9 mm.

15. The plied cord according to claim 11,
wherein the para-aramid fibers are polyparaphenylene terephthalamide fibers.

16. A method for manufacturing the plied cord described in claim 11, comprising:
  a primary twist step of subjecting the para-aramid fibers to a primary twist in one direction to obtain the primarily-twisted yarn, and
  a secondary twist step of arranging four bundles of the primarily-twisted yarns obtained in the primary twist step and subjecting them to a secondary twist in an opposite direction to the primary twist, to obtain the plied cord.

17. A power-transmission belt comprising a tension member formed of the plied cord described in claim 11.

18. The power-transmission belt according to claim 17,
wherein the plied cord and has an average pitch of the cord of 0.8 to 1.05 mm.

19. The power-transmission belt according to claim 17, further comprising a compression rubber layer formed of a rubber composition comprising a rubber component,
wherein the rubber component is an ethylene-α-olefin elastomer.

20. A method for using the power-transmission belt described in claim 17, for driving an ISG-mounted engine.

* * * * *